United States Patent
Toda et al.

(10) Patent No.: US 9,243,158 B2
(45) Date of Patent: Jan. 26, 2016

(54) AQUEOUS INK FOR INKJET, INKJET RECORDING DEVICE, INKJET PRINTED MATTER, AND INKJET RECORDING METHOD

(71) Applicants: Naohiro Toda, Kanagawa (JP); Tomohiro Nakagawa, Kanagawa (JP); Hidefumi Nagashima, Kanagawa (JP); Ichiroh Fujii, Kanagawa (JP)

(72) Inventors: Naohiro Toda, Kanagawa (JP); Tomohiro Nakagawa, Kanagawa (JP); Hidefumi Nagashima, Kanagawa (JP); Ichiroh Fujii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/297,868

(22) Filed: Jun. 6, 2014

(65) Prior Publication Data
US 2014/0377516 A1    Dec. 25, 2014

(30) Foreign Application Priority Data

Jun. 24, 2013  (JP) .................................. 2013-131565
Apr. 4, 2014  (JP) .................................. 2014-077857

(51) Int. Cl.
| | |
|---|---|
| *B41M 5/00* | (2006.01) |
| *C09D 11/36* | (2014.01) |
| *B41J 11/00* | (2006.01) |
| *C09D 11/322* | (2014.01) |
| *C09D 11/38* | (2014.01) |

(52) U.S. Cl.
CPC ............... *C09D 11/36* (2013.01); *B41J 11/002* (2013.01); *B41J 11/0015* (2013.01); *C09D 11/322* (2013.01); *C09D 11/38* (2013.01); *Y10T 428/24901* (2015.01)

(58) Field of Classification Search
CPC ...... C09D 11/36; C09D 11/322; C09D 11/38; B41J 11/0015; B41J 11/002; Y10T 428/24901
USPC ........................... 428/32.1; 347/105; 523/160
See application file for complete search history.

(56) References Cited

U.S. PATENT DOCUMENTS

| | | | |
|---|---|---|---|
| 2008/0061673 A1* | 3/2008 | Suzuki | H01L 51/5012 313/483 |
| 2008/0081117 A1* | 4/2008 | Sakasai | C09D 11/36 427/384 |
| 2009/0047431 A1 | 2/2009 | Hatada et al. | |
| 2009/0069386 A1* | 3/2009 | Dairiki | A01N 25/02 514/341 |
| 2009/0114120 A1* | 5/2009 | McIntyre et al. | 106/31.65 |
| 2009/0258196 A1 | 10/2009 | Nagashima et al. | |
| 2010/0196673 A1 | 8/2010 | Nagashima et al. | |
| 2010/0302326 A1 | 12/2010 | Morohoshi et al. | |
| 2011/0164086 A1 | 7/2011 | Goto et al. | |
| 2011/0205288 A1 | 8/2011 | Matsuyama et al. | |
| 2011/0318551 A1 | 12/2011 | Nakagawa | |
| 2012/0098883 A1 | 4/2012 | Matsuyama et al. | |
| 2012/0176455 A1* | 7/2012 | Ohta et al. | 347/102 |
| 2012/0188312 A1 | 7/2012 | Nakagawa | |
| 2012/0308785 A1 | 12/2012 | Nakagawa | |
| 2013/0002776 A1 | 1/2013 | Nagashima et al. | |
| 2013/0023614 A1 | 1/2013 | Hatada et al. | |
| 2013/0063524 A1 | 3/2013 | Katoh et al. | |
| 2013/0197144 A1 | 8/2013 | Katoh et al. | |
| 2013/0271524 A1 | 10/2013 | Katoh et al. | |
| 2014/0377516 A1* | 12/2014 | Toda et al. | 428/207 |

FOREIGN PATENT DOCUMENTS

| | | |
|---|---|---|
| JP | 2005-220352 | 8/2005 |
| JP | 2009-067909 | 4/2009 |
| JP | 2011-094082 | 5/2011 |

OTHER PUBLICATIONS

U.S. Appl. No. 14/203,732, filed Mar. 11, 2014.
U.S. Appl. No. 14/074,044, filed Nov. 7, 2013.

* cited by examiner

*Primary Examiner* — Betelhem Shewareged
(74) *Attorney, Agent, or Firm* — Cooper & Dunham LLP

(57) ABSTRACT

An aqueous ink for inkjet recording contains water, a hydrosoluble organic solvent, resin particles, and a pigment, wherein the hydrosoluble organic solvent contains at least three kinds of diol compounds accounting for 45% by weight or more in the hydrosoluble organic solvent, wherein three or more of the at least three kinds of diol compounds have boiling points 10° C. or greater apart from each other.

12 Claims, 2 Drawing Sheets

AQUEOUS INK FOR INKJET, INKJET RECORDING DEVICE, INKJET PRINTED MATTER, AND INKJET RECORDING METHOD

CROSS-REFERENCE TO RELATED APPLICATIONS

This patent application is based on and claims priority pursuant to 35 U.S.C. §119(a) to Japanese Patent Application Nos. 2013-131565 and 2014-077857, filed on Jun. 24, 2013 and Apr. 4, 2014, in the Japan Patent Office, the entire disclosures of which are hereby incorporated by reference herein.

BACKGROUND

1. Technical Field

The present invention relates to an aqueous ink for inkjet recording, an inkjet recording device, an inkjet printed matter, and an inkjet recording method.

2. Background Art

Since inkjet printers are relatively quiet, enjoy low running costs, and easily capable of printing color images, they are now widely used at home as output device of digital signals.

In recent years, inkjet technologies have been appealing in business field of, for example, display, posters, and signboards.

In such use, since porous recording media have problems with regard to light resistance, water resistance, and abrasion resistance, non-porous recording media such as plastic film are used. Accordingly, ink for such non-porous recording medium has been developed.

For example, as such ink, solvent-based inkjet ink using an organic solvent as a vehicle or ultraviolet-curable inkjet ink using a polymerizable monomer as its main component have been widely used.

However, the solvent-based inkjet ink evaporates a large amount of the solvent into air, which is not preferable in terms of environmental burden. Some ultraviolet curable inkjet ink have skin sensitization potential. In addition, since an ultraviolet ray irradiator built into a printer is expensive, the application field of the solvent-based inkjet is limited.

Considering this background, an aqueous ink for inkjet recording as widely used at home so far is appealing because of its less burden on environment. Therefore, development of an aqueous ink for inkjet recording that can be directly printed on a non-porous substrate (non-porous recording medium) is in progress. For example, such developments are disclosed in JP-2005-220352-A and JP-2011-94082-A.

However, such aqueous ink has disadvantages in general with regard to image quality in comparison with a solvent-based inkjet ink.

First, since ink does not basically penetrate into a non-porous substrate, the ink on the non-porous substrate needs drying quickly. However, since water is contained in the aqueous ink as main solvent and a hydrosoluble organic solvent is added as additive, drying property deteriorates, resulting in poor drying. For this reason, when a recorded recording mediums is placed on another recording medium or rolled up, strike-through, so-called blocking, easily occurs.

In addition, most of the non-porous substrates are extremely glossy. Therefore, ink to demonstrate high gloss is demanded in order not to impair the integrity of printed portions and non-printed portions when printed. However, unlike a solvent-based ink in which a resin is dissolved in ink, particles are fused to form a layer in the case of an aqueous ink for inkjet recording. Therefore the surface of a printed non-porous substrate tends to become rough, thereby losing gloss.

SUMMARY

In view of the foregoing, an improved aqueous ink for inkjet recording is provided which contains water, a hydrosoluble organic solvent, resin particles, and a pigment, wherein the hydrosoluble organic solvent contains at least three kinds of diol compounds accounting for 45% by weight or more in the hydrosoluble organic solvent, wherein three or more of the at least three kinds of diol compounds have boiling points 10° C. or greater apart from each other.

BRIEF DESCRIPTION OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

The aqueous ink for inkjet recording of the present disclosure contains at least water, a hydrosoluble organic solvent, resin particles, and a pigment. The hydrosoluble organic solvent contains at least three kinds of diol compounds accounting for 45% by weight or more in the hydrosoluble organic solvent. Three or more of the at least three kinds of diol compounds have boiling points 10° C. or greater apart from each other.

The aqueous ink for inkjet recording, the inkjet recording device, the inkjet printed matter, and the inkjet recording method of the present disclosure are described below.

The following preferable embodiments according to the present disclosure is limited by preferable technologies and the present invention is not limited thereto unless otherwise described. "bp" represents boiling point.

Hydrosoluble Organic Solvent

The hydrosoluble organic solvent for use in the present disclosure contains at least three kinds of diol compounds accounting for 45% by weight or more in the hydrosoluble organic solvent. Among the at least three kinds of diol compounds, three or more diol compounds have boiling points 10° C. or greater apart from each other. The total amount of the diol compounds accounts for 45% by weight or more in the hydrosoluble organic solvent regardless of the content ratio among the diol components. However, the content ratio of each diol component in the total amount of the diol components is preferably 20% by weight or more.

In general, a hydrosoluble organic solvent added to an aqueous ink has a higher boiling point than water and is never or little dried. For this reason, to impart drying property to a hydrosoluble organic solvent, an organic solvent having a relatively low boiling point is added. However, due to quick dry, a layer is formed by resin particles too soon in general. Consequently, an uneven layer is easily formed, so that the strength of the gloss of the formed layer become inferior. For this reason, the at least three kinds of diol compounds are used to form an even layer with high gloss.

In addition, if quick drying is demanded for an ink in the conventional inkjet recording method including a heating process after printing, a layer is formed too soon to sufficiently smooth the layer in the process of solidification of liquid ink. As a result, the gloss of the layer is inferior.

However, by mixing multiple diol compounds having different boiling points with high polarity as the hydrosoluble organic solvents, as the solvents evaporate step by step, the resin particles in ink are gradually dissolved. For this reason, it is possible to prolong the time to solidify a liquid ink, thereby forming a uniform layer having significantly improved gloss.

Specific examples of the combinations of compounds as the hydrosoluble organic solvent for use in the present disclosure include, but are not limited to, the following. Any combination containing at least three kinds of diol compounds having different boiling points 10° C. or greater apart from each other is usable.

In addition, if such a combination contains four or more kinds of dial compounds, three of which have different boiling points 10° C. or greater apart from each other, there is no specific limit to the boiling points of the diol compounds other than the three. With regard to the content ratio, not the three but the four or more kinds of dial compounds accounts for 45% by weight or more in the hydrosoluble organic solvent.

TABLE 1

| No. | Diol compound No. 1 | Diol compound No. 2 | Diol compound No. 3 |
|---|---|---|---|
| 1 | 2,3-butane diol (bp: 183° C.) | 1,2-butane diol (bp: 194° C.) | 1,3-propane diol (bp. 214° C.) |
| 2 | 2,3-butane diol (bp: 183° C.) | 1,2-butane diol (bp: 194° C.) | 1,2-hexane diol (bp: 223° C.) |
| 3 | 2,3-butane diol (bp: 183° C.) | 1,2-butane diol (bp: 194° C.) | 1,4-butane diol (bp: 230° C.) |
| 4 | 2,3-butane diol (bp: 183° C.) | 1,2-butane diol (bp: 194° C.) | 2-ethyl-1,3-hexane diol (bp: 244° C.) |
| 5 | 2,3-butane diol (bp: 183° C.) | 1,2-butane diol (bp: 194° C.) | Diethylene glycol (bp: 245° C.) |
| 6 | 2,3-butane diol (bp: 183° C.) | Etylene glycol (bp: 196° C.) | 1,3-propane diol (bp. 214° C.) |
| 7 | 2,3-butane diol (bp: 183° C.) | Etylene glycol (bp: 196° C.) | 1,2-hexane diol (bp: 223° C.) |
| 8 | 2,3-butane diol (bp: 183° C.) | Etylene glycol (bp: 196° C.) | 1,4-butane diol (bp: 230° C.) |
| 9 | 2,3-butane diol (bp: 183° C.) | Etylene glycol (bp: 196° C.) | 2-ethyl-1,3-hexane diol (bp: 244° C.) |
| 10 | 2,3-butane diol (bp: 183° C.) | Etylene glycol (bp: 196° C.) | Diethylene glycol (bp: 245° C.) |
| 11 | 2,3-butane diol (bp: 183° C.) | 2-mehyl-2,4-pentane diol (bp: 198° C.) | 1,3-propane diol (bp. 214° C.) |
| 12 | 2,3-butane diol (bp: 183° C.) | 2-mehyl-2,4-pentane diol (bp: 198° C.) | 1,2-hexane diol (bp: 223° C.) |
| 13 | 2,3-butane diol (bp: 183° C.) | 2-mehyl-2,4-pentane diol (bp: 198° C.) | 1,4-butane diol (bp: 230° C.) |
| 14 | 2,3-butane diol (bp: 183° C.) | 2-mehyl-2,4-pentane diol (bp: 198° C.) | 2-ethyl-1,3-hexane diol (bp: 244° C.) |
| 15 | 2,3-butane diol (bp: 183° C.) | 2-mehyl-2,4-pentane diol (bp: 198° C.) | Diethylene glycol (bp: 245° C.) |
| 16 | 2,3-butane diol (bp: 183° C.) | 2,4-pentane diol (bp: 201° C.) | 1,3-propane diol (bp. 214° C.) |
| 17 | 2,3-butane diol (bp: 183° C.) | 2,4-pentane diol (bp: 201° C.) | 1,2-hexane diol (bp: 223° C.) |
| 18 | 2,3-butane diol (bp: 183° C.) | 2,4-pentane diol (bp: 201° C.) | 1,4-butane diol (bp: 230° C.) |
| 19 | 2,3-butane diol (bp: 183° C.) | 2,4-pentane diol (bp: 201° C.) | 2-ethyl-1,3-hexane diol (bp: 244° C.) |
| 20 | 2,3-butane diol (bp: 183° C.) | 2,4-pentane diol (bp: 201° C.) | Diethylene glycol (bp: 245° C.) |

TABLE 2

| No. | Diol compound No. 1 | Diol compound No. 2 | Diol compound No. 3 |
|---|---|---|---|
| 21 | 2,3-butane diol (bp: 183° C.) | 1,3-butane diol (bp: 203° C.) | 1,3-propane diol (bp. 214° C.) |
| 22 | 2,3-butane diol (bp: 183° C.) | 1,3-butane diol (bp: 203° C.) | 1,2-hexane diol (bp: 223° C.) |
| 23 | 2,3-butane diol (bp: 183° C.) | 1,3-butane diol (bp: 203° C.) | 1,4-butane diol (bp: 230° C.) |
| 24 | 2,3-butane diol (bp: 183° C.) | 1,3-butane diol (bp: 203° C.) | 2-ethyl-1,3-hexane diol (bp: 244° C.) |
| 25 | 2,3-butane diol (bp: 183° C.) | 1,3-butane diol (bp: 203° C.) | Diethylene glycol (bp: 245° C.) |
| 26 | 2,3-butane diol (bp: 183° C.) | 3-methyl-1,3-butane diol (bp: 203° C.) | 1,3-propane diol (bp. 214° C.) |
| 27 | 2,3-butane diol (bp: 183° C.) | 3-methyl-1,3-butane diol (bp: 203° C.) | 1,2-hexane diol (bp: 223° C.) |
| 28 | 2,3-butane diol (bp: 183° C.) | 3-methyl-1,3-butane diol (bp: 203° C.) | 1,4-butane diol (bp: 230° C.) |
| 29 | 2,3-butane diol (bp: 183° C.) | 3-methyl-1,3-butane diol (bp: 203° C.) | 2-ethyl-1,3-hexane diol (bp: 244° C.) |
| 30 | 2,3-butane diol (bp: 183° C.) | 3-methyl-1,3-butane diol (bp: 203° C.) | Diethylene glycol (bp: 245° C.) |
| 31 | 2,3-butane diol (bp: 183° C.) | 1,3-propane diol (bp: 214° C.) | 1,4-butane diol (bp: 230° C.) |
| 32 | 2,3-butane diol (bp: 183° C.) | 1,3-propane diol (bp: 214° C.) | 2-ethyl-1,3-hexane diol (bp: 244° C.) |
| 33 | 2,3-butane diol (bp: 183° C.) | 1,3-propane diol (bp: 214° C.) | Diethylene glycol (bp: 245° C.) |
| 34 | 2,3-butane diol (bp: 183° C.) | 1,2-hexane diol (bp: 223° C.) | 2-ethyl-1,3-hexane diol (bp: 244° C.) |
| 35 | 2,3-butane diol (bp: 183° C.) | 1,2-hexane diol (bp: 223° C.) | Diethylene glycol (bp: 245° C.) |
| 36 | 2,3-butane diol (bp: 183° C.) | 1,4-butane diol (bp: 230° C.) | 2-ethyl-1,3-hexane diol (bp: 244° C.) |
| 37 | 2,3-butane diol (bp: 183° C.) | 1,4-butane diol (bp: 230° C.) | Diethylene glycol (bp: 245° C.) |
| 38 | 1,2-propane diol (bp: 187° C.) | 2-methyl-2,4-pentane diol (bp: 198° C.) | 1,3-propane diol (bp. 214° C.) |
| 39 | 1,2-propane diol (bp: 187° C.) | 2-methyl-2,4-pentane diol (bp: 198° C.) | 1,2-hexane diol (bp: 223° C.) |

TABLE 3

| No. | Diol compound No. 1 | Diol compound No. 2 | Diol compound No. 3 |
|---|---|---|---|
| 40 | 1,2-propane diol (bp: 187° C.) | 2-methyl-2,4-pentane diol (bp: 198° C.) | 1,4-butane diol (bp: 230° C.) |
| 41 | 1,2-propane diol (bp: 187° C.) | 2-methyl-2,4-pentane diol (bp: 198° C.) | 2-ethyl-1,3-hexane diol (bp: 244° C.) |
| 42 | 1,2-propane diol (bp: 187° C.) | 2-methyl-2,4-pentane diol (bp: 198° C.) | Diethylene glycol (bp: 245° C.) |
| 43 | 1,2-propane diol (bp: 187° C.) | 2,4-pentane diol (bp: 201° C.) | 1,3-propane diol (bp. 214° C.) |
| 44 | 1,2-propane diol (bp: 187° C.) | 2,4-pentane diol (bp: 201° C.) | 1,2-hexane diol (bp: 223° C.) |
| 45 | 1,2-propane diol (bp: 187° C.) | 2,4-pentane diol (bp: 201° C.) | 1,4-butane diol (bp: 230° C.) |
| 46 | 1,2-propane diol (bp: 187° C.) | 2,4-pentane diol (bp: 201° C.) | 2-ethyl-1,3-hexane diol (bp: 244° C.) |
| 47 | 1,2-propane diol (bp: 187° C.) | 2,4-pentane diol (bp: 201° C.) | Diethylene glycol (bp: 245° C.) |
| 48 | 1,2-propane diol (bp: 187° C.) | 1,3-butane diol (bp: 203° C.) | 1,3-propane diol (bp. 214° C.) |
| 49 | 1,2-propane diol (bp: 187° C.) | 1,3-butane diol (bp: 203° C.) | 1,2-hexane diol (bp: 223° C.) |
| 50 | 1,2-propane diol (bp: 187° C.) | 1,3-butane diol (bp: 203° C.) | 1,4-butane diol (bp: 230° C.) |
| 51 | 1,2-propane diol (bp: 187° C.) | 1,3-butane diol (bp: 203° C.) | 2-ethyl-1,3-hexane diol (bp: 244° C.) |
| 52 | 1,2-propane diol (bp: 187° C.) | 1,3-butane diol (bp: 203° C.) | Diethylene glycol (bp: 245° C.) |
| 53 | 1,2-propane diol (bp: 187° C.) | 3-methyl-1,3-butane diol (bp: 203° C.) | 1,3-propane diol (bp. 214° C.) |
| 54 | 1,2-propane diol (bp: 187° C.) | 3-methyl-1,3-butane diol (bp: 203° C.) | 1,2-hexane diol (bp: 223° C.) |

TABLE 3-continued

| No. | Diol compound No. 1 | Diol compound No. 2 | Diol compound No. 3 |
|---|---|---|---|
| 55 | 1,2-propane diol (bp. 187° C.) | 3-methyl-1,3-butane diol (bp: 203° C.) | 1,4-butane diol (bp: 230° C.) |
| 56 | 1,2-propane diol (bp. 187° C.) | 3-methyl-1,3-butane diol (bp: 203° C.) | 2-ethyl-1,3-hexane diol (bp: 244° C.) |
| 57 | 1,2-propane diol (bp. 187° C.) | 3-methyl-1,3-butane diol (bp: 203° C.) | Diethylene glycol (bp: 245° C.) |
| 58 | 1,2-propane diol (bp. 187° C.) | 1,3-propane diol (bp. 214° C.) | 1,4-butane diol (bp: 230° C.) |
| 59 | 1,2-propane diol (bp. 187° C.) | 1,3-propane diol (bp. 214° C.) | 2-ethyl-1,3-hexane diol (bp: 244° C.) |

TABLE 4

| No. | Diol compound No. 1 | Diol compound No. 2 | Diol compound No. 3 |
|---|---|---|---|
| 60 | 1,2-propane diol (bp. 187° C.) | 1,3-propane diol (bp. 214° C.) | Diethylene glycol (bp: 245° C.) |
| 61 | 1,2-propane diol (bp. 187° C.) | 1,2-hexane diol (bp: 223° C.) | 2-ethyl-1,3-hexane diol (bp: 244° C.) |
| 62 | 1,2-propane diol (bp. 187° C.) | 1,2-hexane diol (bp: 223° C.) | Diethylene glycol (bp: 245° C.) |
| 63 | 1,2-propane diol (bp. 187° C.) | 1,4-butane diol (bp: 230° C.) | 2-ethyl-1,3-hexane diol (bp: 244° C.) |
| 64 | 1,2-propane diol (bp. 187° C.) | 1,4-butane diol (bp: 230° C.) | Diethylene glycol (bp: 245° C.) |
| 65 | 1,2-butane diol (bp. 194° C.) | 1,3-propane diol (bp. 214° C.) | 1,4-butane diol (bp: 230° C.) |
| 66 | 1,2-butane diol (bp. 194° C.) | 1,3-propane diol (bp. 214° C.) | 2-ethyl-1,3-hexane diol (bp: 244° C.) |
| 67 | 1,2-butane diol (bp. 194° C.) | 1,3-propane diol (bp. 214° C.) | Diethylene glycol (bp: 245° C.) |
| 68 | 1,2-butane diol (bp. 194° C.) | 1,2-hexane diol (bp: 223° C.) | 2-ethyl-1,3-hexane diol (bp: 244° C.) |
| 69 | 1,2-butane diol (bp. 194° C.) | 1,2-hexane diol (bp: 223° C.) | Diethylene glycol (bp: 245° C.) |
| 70 | 1,2-butane diol (bp. 194° C.) | 1,4-butane diol (bp: 230° C.) | 2-ethyl-1,3-hexane diol (bp: 244° C.) |
| 71 | 1,2-butane diol (bp. 194° C.) | 1,4-butane diol (bp: 230° C.) | Diethylene glycol (bp: 245° C.) |
| 72 | Ethylene glycol (bp: 196° C.) | 1,3-propane diol (bp. 214° C.) | 1,4-butane diol (bp: 230° C.) |
| 73 | Ethylene glycol (bp: 196° C.) | 1,3-propane diol (bp. 214° C.) | 2-ethyl-1,3-hexane diol (bp: 244° C.) |
| 74 | Ethylene glycol (bp: 196° C.) | 1,3-propane diol (bp. 214° C.) | Diethylene glycol (bp: 245° C.) |
| 75 | Ethylene glycol (bp: 196° C.) | 1,2-hexane diol (bp: 223° C.) | 2-ethyl-1,3-hexane diol (bp: 244° C.) |
| 76 | Ethylene glycol (bp: 196° C.) | 1,2-hexane diol (bp: 223° C.) | Diethylene glycol (bp: 245° C.) |
| 77 | Ethylene glycol (bp: 196° C.) | 1,4-butane diol (bp: 230° C.) | 2-ethyl-1,3-hexane diol (bp: 244° C.) |
| 78 | Ethylene glycol (bp: 196° C.) | 1,4-butane diol (bp: 230° C.) | Diethylene glycol (bp: 245° C.) |
| 79 | 2-methyl-2,4-pentane diol (bp: 198° C.) | 1,3-propane diol (bp. 214° C.) | 1,4-butane diol (bp: 230° C.) |

TABLE 5

| No. | Diol compound No. 1 | Diol compound No. 2 | Diol compound No. 3 |
|---|---|---|---|
| 80 | 2-methyl-2,4-pentane diol (bp: 198° C.) | 1,3-propane diol (bp. 214° C.) | 2-ethyl-1,3-hexane diol (bp: 244° C.) |
| 81 | 2-methyl-2,4-pentane diol (bp: 198° C.) | 1,3-propane diol (bp. 214° C.) | Diethylene glycol (bp: 245° C.) |
| 82 | 2-methyl-2,4-pentane diol (bp: 198° C.) | 1,2-hexane diol (bp: 223° C.) | 2-ethyl-1,3-hexane diol (bp: 244° C.) |
| 83 | 2-methyl-2,4-pentane diol (bp: 198° C.) | 1,2-hexane diol (bp: 223° C.) | Diethylene glycol (bp: 245° C.) |
| 84 | 2-methyl-2,4-pentane diol (bp: 198° C.) | 1,4-butane diol (bp: 230° C.) | 2-ethyl-1,3-hexane diol (bp: 244° C.) |
| 85 | 2-methyl-2,4-pentane diol (bp: 198° C.) | 1,4-butane diol (bp: 230° C.) | Diethylene glycol (bp: 245° C.) |
| 86 | 2,4-pentane diol (bp: 201° C.) | 1,3-propane diol (bp. 214° C.) | 1,4-butane diol (bp: 230° C.) |
| 87 | 2,4-pentane diol (bp: 201° C.) | 1,3-propane diol (bp. 214° C.) | 2-ethyl-1,3-hexane diol (bp: 244° C.) |
| 88 | 2,4-pentane diol (bp: 201° C.) | 1,3-propane diol (bp. 214° C.) | Diethylene glycol (bp: 245° C.) |
| 89 | 2,4-pentane diol (bp: 201° C.) | 1,2-hexane diol (bp: 223° C.) | 2-ethyl-1,3-hexane diol (bp: 244° C.) |
| 90 | 2,4-pentane diol (bp: 201° C.) | 1,2-hexane diol (bp: 223° C.) | Diethylene glycol (bp: 245° C.) |
| 91 | 2,4-pentane diol (bp: 201° C.) | 1,4-butane diol (bp: 230° C.) | 2-ethyl-1,3-hexane diol (bp: 244° C.) |
| 92 | 2,4-pentane diol (bp: 201° C.) | 1,4-butane diol (bp: 230° C.) | Diethylene glycol (bp: 245° C.) |
| 93 | 1,3-butane diol (bp: 203° C.) | 1,3-propane diol (bp. 214° C.) | 1,4-butane diol (bp: 230° C.) |
| 94 | 1,3-butane diol (bp: 203° C.) | 1,3-propane diol (bp. 214° C.) | 2-ethyl-1,3-hexane diol (bp: 244° C.) |
| 95 | 1,3-butane diol (bp: 203° C.) | 1,3-propane diol (bp. 214° C.) | Diethylene glycol (bp: 245° C.) |
| 96 | 1,3-butane diol (bp: 203° C.) | 1,2-hexane diol (bp: 223° C.) | 2-ethyl-1,3-hexane diol (bp: 244° C.) |
| 97 | 1,3-butane diol (bp: 203° C.) | 1,2-hexane diol (bp: 223° C.) | Diethylene glycol (bp: 245° C.) |
| 98 | 1,3-butane diol (bp: 203° C.) | 1,4-butane diol (bp: 230° C.) | 2-ethyl-1,3-hexane diol (bp: 244° C.) |
| 99 | 1,3-butane diol (bp: 203° C.) | 1,4-butane diol (bp: 230° C.) | Diethylene glycol (bp: 245° C.) |

TABLE 6

| No. | Diol compound No. 1 | Diol compound No. 2 | Diol compound No. 3 |
|---|---|---|---|
| 100 | 3-methyl-1,3-butane diol (bp: 203° C.) | 1,3-propane diol (bp. 214° C.) | 1,4-butane diol (bp: 230° C.) |
| 101 | 3-methyl-1,3-butane diol (bp: 203° C.) | 1,3-propane diol (bp. 214° C.) | 2-ethyl-1,3-hexane diol (bp: 244° C.) |
| 102 | 3-methyl-1,3-butane diol (bp: 203° C.) | 1,3-propane diol (bp. 214° C.) | Diethylene glycol (bp: 245° C.) |
| 103 | 3-methyl-1,3-butane diol (bp: 203° C.) | 1,2-hexane diol (bp: 223° C.) | 2-ethyl-1,3-hexane diol (bp: 244° C.) |
| 104 | 3-methyl-1,3-butane diol (bp: 203° C.) | 1,2-hexane diol (bp: 223° C.) | Diethylene glycol (bp: 245° C.) |
| 105 | 2-methyl-2,4-pentane diol (bp: 244° C.) | 1,2-hexane diol (bp: 223° C.) | 2-ethyl-1,3-hexane diol (bp: 244° C.) |
| 106 | 1,3-propane diol (bp. 214° C.) | 1,2-hexane diol (bp: 223° C.) | Diethylene glycol (bp: 245° C.) |
| 107 | 1,3-propane diol (bp. 214° C.) | 1,4-butane diol (bp: 230° C.) | 2-ethyl-1,3-hexane diol (bp: 244° C.) |
| 108 | 1,3-propane diol (bp. 214° C.) | 1,4-butane diol (bp: 230° C.) | Diethylene glycol (bp: 245° C.) |

The addition amount of the hydrosoluble organic solvent containing these diol compounds to ink accounts for 45% by weight or more in the hydrosoluble organic solvent contained in the ink, which leads to improvement of the gloss of a formed layer in particular. When the addition amount is too small, for example less than 45% by weight, desired gloss is not obtained.

Of these diol compounds, the diol compound having the lowest boiling point is preferably 2,3-butane diol or 1,2-propane diol. The boiling point of the diol compound having the lowest boiling point is preferably 170° C. or higher. 2,3-butane diol or 1,2-propane diol has a relatively low boiling point in comparison with other diol compounds, which is advantageous to design the boiling point 10° C. or greater apart from others. Moreover, good images without poor drying are obtained.

In addition, of these diol compounds, the diol compound having the highest boiling point is preferably 1,3-propane diol or 1,2-hexane diol. The boiling point of the diol compound having the highest boiling point is preferably from 200° C. to 250° C. 1,3-propane diol or 1,2-hexane diol is advantageous to design the boiling point 10° C. or greater apart from others. In addition, images having high gloss are obtained.

Moreover, the hydrosoluble organic solvent for use in the present disclosure preferably excludes a hydrosoluble organic solvent having a boiling point surpassing 250° C. By containing no hydrosoluble organic solvent having a boiling point surpassing 250° C., good drying property and abrasion resistance are obtained.

In the present disclosure, hydrosoluble organic solvents other than diol compounds can be used and there is no specific limit to the kind thereof. Specific examples thereof include, but are not limited to, polyol alkyl ethers such as diethylene glycol n butyl ether, dipropylene glycol monomethyl ether, propylene glycol n butyl ether, propylene glycol t butyle ether, diethylene glycol methyl ether, ethylene glycol n propyl ether, ethylene glycol n buthyl ether, dipropylene glycol n-propyl ether, tripropylene glycol methyl ether, tripeopylene glycol n-propyl ether, propylene glycol phenyl ether, triethylene glycol methyl ether, triethylene glycol methyl ether, triethylene glycol ethyl ether, diethylene glycol n-hexyl ether, and ethylene glycol phenyl ether; esters such as ethy lactate; nitrogen-containing heterocyclic compounds such as N-methyl-2-pyrroridone, N-hydroxyethyl-2-pyrroridone, 2-pyrroridone, 1,3-dimethyl imidazolidinone, and ϵ-caprolactome; and amides such as formamide, N-methyl formamide, and N,N-dimethyl form amide.

Water

There is no specific limit to water for use in the present disclosure. Specific examples thereof include, but are not limited to, pure water such as deionozed water, ultrafiltrated water, mill-Q water, and distillated water or ultrapure water. There is no specific limit to the amount of water in the ink for inkjet recording. It can be determined to a particular application.

Resin Particle

Resin particles are present as a resin emulsion dispersed in water as a continuous phase. There is no specific limit to the kind of the resin particles. Suitable resin particles can be select to a particular application. Specific examples thereof include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Any suitably synthesized resin particles and products available in the market are also usable. Specific examples of the resin particles include, but are not limited to, Microgel E-1002 and E-5002 (styrene-acrylic-based resin particles, manufactured by Nippon Paint co., Ltd.), Voncoat 4001 (acrylic-based resin particles, manufactured by Dainippon Ink and Chemicals, Inc.), Voncoat 5454 (styrene/acrylic-based resin particles, manufactured by Dainippon Ink and Chemicals, Inc.), SAE-1014 (styrene-acrylic-based resin particles, manufactured by Nippon Zeon Co., Ltd.), and Saivinol SK-200 (acrylic-based resin particles, manufactured by Saiden Chemical Industry Co., Ltd.), Primal AC-22 and AC-61 (acrylic-based resin particles, manufactured by The Dow Chemical Company), NANOCRYL SBCX-2821 and 3689 (acrylic-silicone-based resin particles, manufactured by Toyo Ink Co., Ltd.), #3070 (methyl methacrylate polymer resin particles, manufactured by MIKUNI COLOR LTD.), and HYDRAN HW-340 (water-based polyurethane resin particles, manufactured by DIC Corporation).

Of these resin particles, acrylic-based resins and urethane resins are more preferable in terms of fixability on a non-porous substrate and ink stability. Such resin particles optionally contain a dispersant such as a surfactant.

In addition, with regard to the particle diameter of the resin particles, considering using these in an inkjet recording device, the volume average particle diameter is preferably from 10 nm to 200 nm and more preferably from 10 nm to 50 nm.

By using resin particles having a volume average particle diameter of from 10 nm to 50 nm, the smoothness of an ink layer is further improved in the drying process of a diol compound, which leads to high gloss thereof.

The volume average particle diameter can be measured by using a particle size analyzer (Microtrac MODEL UPA 9340, manufactured by Nikkiso Co., Ltd.).

The content of resin particles preferably ranges from 1% by weight to 15% by weight in the total content of an aqueous ink in terms of fixability and ink stability and more preferably from 5% by weight to 15% by weight in terms of improvement of the smoothness and the gloss of an ink layer and fixability on a substrate. In addition, it is preferable that the content of resin particles is more than that of a pigment, which is described later.

Pigment

There is no specific limit to the pigment for use in the present disclosure. Any suitable pigment can be selected to a particular application. For example, inorganic pigments and organic pigments for black or color can be used. These can be used alone or in combination.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used.

Of these pigments, pigments having good affinity with solvents are preferable in particular. In addition, the addition amount of a pigment serving as coloring material in an ink composition preferably ranges from about 0.1% by weight to about 10% by weight and more preferably from about 1% by weight to about 10% by weight. In this range, properties such as image definition, image quality, fixability, discharging stability ameliorate and clogging is subdued.

In the present disclosure, more preferred specific examples of the pigments for black include, but are not limited to, carbon black (C.I. Pigment Black 7) such as furnace black, lamp black, acetylene black, and channel black, metals such as copper and iron (C.I. Pigment Black 11), metal compounds such as titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 81, 83, 95, 97, 98, 100, 101, 104, 108, 109, 110, 117, 120, 138, 150, and 153; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

In addition, self-dispersible pigments can be used in which a functional group such as sulfone group and carboxyl group is attached to the surface of a pigment (e.g., carbon), thereby being dispersible in water. Also, it is possible to use a material in which a pigment is encapsulated in a microcapsule to be dispersible in water.

These can be paraphrased as resin particles encapsulating pigment particles. In this case, pigments blended in ink are not necessarily encapsulated or adsorbed in resin particles. Such pigments dispersed in ink are within the scope unless the effect of the present disclosure is impaired.

There is no specific limit to the particle diameter of a pigment. In the present disclosure, it is preferable to use pigment ink having a particle diameter of from 20 nm to 150 nm at most frequency in maximum number conversion. When the particle diameter is 150 nm at most, the dispersion stability of a pigment as an ink composition is good with excellent discharging stability, thereby improving the image quality such as image density, which is preferable. When the particle diameter is 20 nm at minimum, dispersion operation and classification operation are made easy, which makes it possible to manufacture a recording liquid in an cost-effective and easy manner.

When dispersing a pigment using a dispersant, any known dispersant can be selected for use. For example, dispersant polymers and hydrosoluble surfactants are usable.

Surface Active Agent (Surfactant)

As for the ink of the present disclosure, a surfactant can be added so as to secure wettability to a recording medium. The addition amount of a surfactant is preferably from 0.1% by weight to 5% by weight as effective component in ink. When the addition amount is 0.1% by weight at minimum, wettability to a non-porous substrate is sufficiently obtained and image quality ameliorates. When the addition amount is 5% by weight at maximum, foaming never or little occurs, thereby preventing non-discharging of ink. There is no specific limit to a surfactant used if the addition amount thereof is within this range.

In the present disclosure, an amphoteric surfactant, a nonionic surfactant, and an anionic surfactant are usable. Considering the relation between the dispersability of a coloring material and image quality, nonionic surfactants are preferable such as polyoxyethylene alkyl phenyl ether, polyoxyethylene alkyl ester, polyoxyethylene alkyl amine, polyoxyethylene alkyl amide, polyoxyethylene propylene block polymer, sorbitan aliphatic esters, polyoxyethylene sorbitan aliphatic acid esters, and adducts of acetylene alcohol with ethylene oxides. In addition, it is possible to add a fluorine-containing surfactant or silicone-based surfactant depending on prescription.

Other Additives

Examples of other additives include, preservatives and fungicides, corrosion inhibitors, and pH regulators.

Specific examples of preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors include, but are not limited to, acid sulfite, thiosodium sulfate, ammonium thiodiglycolate, diisopropyl ammonium nitrite, pentaerythritol tetranitrate, and dicyclohexyl ammonium nitrite.

There is no specific limit to the selection of pH regulator and any material that can adjust to a particular pH without an adverse impact on prescribed ink can be used as pH regulator. Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink of the present disclosure is manufactured by dissolving the ink composition mentioned above in an aqueous medium followed by optional mixing and stirring. Mixing and stirring can be conducted by a typical stirrer using a stirring wing, a magnetic stirrer, a high performance disperser, etc. The present disclosure is not dependent on the manufacturing method.

Inkjet Recording Device

The inkjet recording device of the present disclosure has at least a printing device to print an image on a recording medium and a heating device to heat the printed recording medium. In addition, the inkjet recording device optionally includes an ink discharging device to record an image by discharging ink by applying an energy to an aqueous ink for inkjet recording and a transfer device to transfer a non-porous substrate formed of plastic film such as vinyl chloride resin film, PET film, and polycarbonate film and another recording medium.

The ink discharging device discharges ink to form an image by applying an stimulus to the aqueous ink of the present disclosure. There is no specific limit to the ink discharging device. Appropriate devices are selected to particular applications. For example, various recording heads (ink discharging heads) can be used. In particular, a unit having a head multiple nozzle lines and a sub-tank accommodating liquid supplied from a liquid reserve tank to supply the liquid to the head is preferable.

As the sub-tank, it is preferable to have a negative pressure producing device to produce a negative pressure in a sub-tank, an air releasing device to release air in the sub-tank, and a detector to detect whether there is ink by the difference of electric resistances.

There is no specific limit to the stimulus. Specific examples thereof include, but are not limited to, a heat (temperature), pressure, vibration, and light. These can be used alone or in combination. Of these, heat and pressure are preferable.

Examples of the device to generate such a stimulus include a heater, a pressurization device, a piezoelectirc element, a vibrator, an ultrasonic oscillator, light, etc. Specific examples thereof include, but are not limited to, a piezoelectric actuator as the piezoelectric element, a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

There is no specific limit to the discharging of ink, which depends on the kind of the stimuli mentioned above. For example, in a case in which the stimulus is "heat", a method can be used in which thermal energy corresponding to recording signals is applied by, for example, a thermal head to generate foams in the ink in a recording head and the ink is discharged and sprayed as droplets from the nozzles of the recording head by the pressure of the foam.

In addition, in a case in which the stimulus is "pressure", for example, a method can be used in which ink is discharged and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room.

In the present disclosure, it is preferable to discharge ink by applying a voltage to a piezoelectric element.

No heat is generated by the piezoelectric system, which is advantageous to discharge ink containing a resin. This is particularly suitable to subdue clogging in nozzles when ink containing a small amount of wetting agent is used.

In addition, to prevent non-discharging of ink caused by clogging of nozzles, it is preferable to conduct false scanning by applying to a piezoelectric element a voltage above which ink is discharged. Furthermore, before false scanning reaching an amount corresponding to one page printing, it is preferable to operate discharging ink in an ink storing portion.

In addition, it is preferable to include a scraper to scrape ink fixated on a receiver of false discharging. Using a wiper or a cutter is preferable as the scraper.

In addition, the inkjet recording device of the present disclosure optionally has a transfer device to transfer a recording medium. As the transfer device, known transfer devices such as a transfer roller and a transfer belt are suitable.

Moreover, the inkjet recording device of the present disclosure includes a heating device to fix ink droplets on a recording medium such as a non-porous substrate. One of multiple of many kinds of known heaters can be used as the heater.

Specific examples thereof include, but are not limited to, devices for forced-air heating, radiation heating, conduction heating, or microwave drying. These can be used alone or in combination. The heating temperature of the heater mentioned above for a recording medium is preferably from 40° C. to 80° C. and more preferably from 50° C. to 80° C. An inkjet recording device becomes capable of outputting good images without heat deformation of the substrate by setting a particular temperature.

An embodiment of the inkjet recording device of the present disclosure is described with reference to drawings. In the following, non-porous substrates are used for description but the present disclosure is not limited to non-porous substrates.

Figure 1:
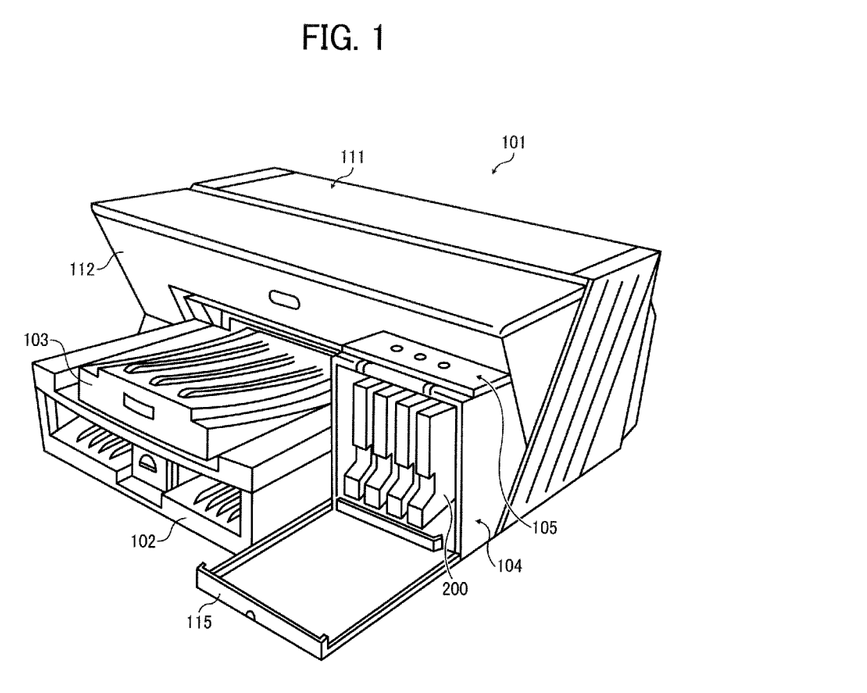
FIG. 1 is a schematic diagram illustrating an example of the inkjet recording device using the ink of the present disclosure according to an embodiment of the present invention.

FIG. 1 is a schematic diagram illustrating an example of an inkjet recording device of the present disclosure.

An inkjet recording device 101 illustrated in FIG. 1 includes a sheet feeder tray 102 to accommodate non-porous substrates placed in the inkjet recording device 101, a discharging tray 103 installed in the inkjet recording device 101, which stores the non-porous substrates on which images are recorded (formed), and an ink cartridge inserting unit 104. On the upper surface of the ink cartridge inserting portion 104 is arranged an operating unit 105 such as operation keys and a display.

The ink cartridge inserting portion 104 has a front cover 115 that is openable and closable to detach and attach an ink cartridge 200. In FIG. 1, 111 represents an upper cover and 11 represents a front part of the recording device 101.

Figure 2:
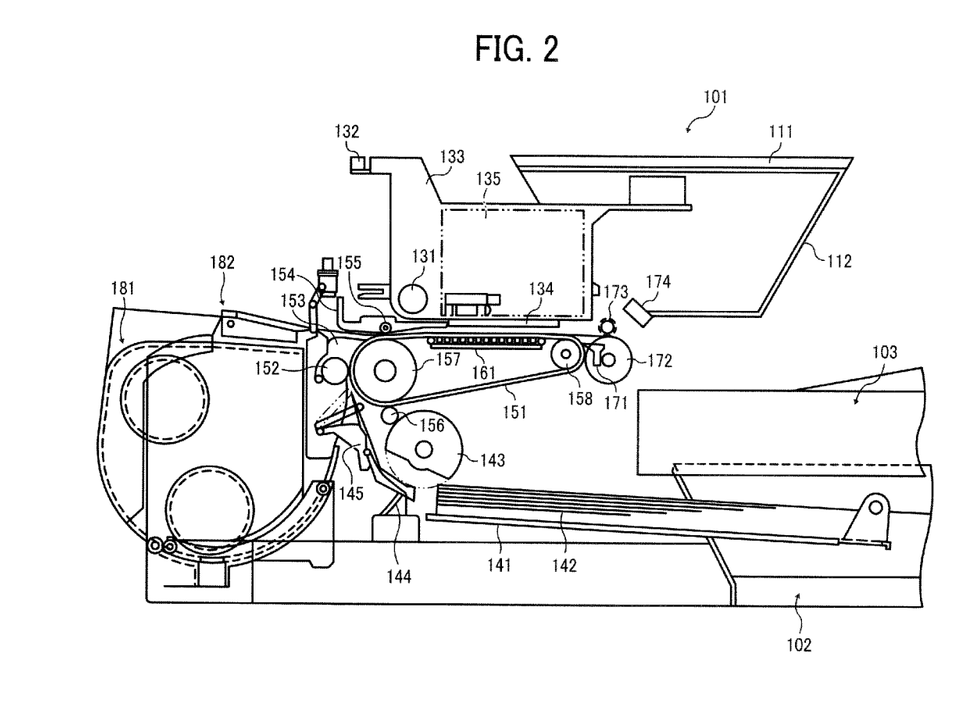
FIG. 2 is a schematic diagram illustrating another example of the inkjet recording device using the ink of the present disclosure according to an embodiment of the present invention.

Inside the inkjet recording device 101, as illustrated in FIG. 2, a guide rod 131 serving as a guiding member that laterally bridges side plates provided on the right side and left side and a stay 132 hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub tanks 135 for colors to supply each color ink to the recording head 134. The ink of inkjet is supplied and replenished to the sub tank 135 from the ink cartridge 200 mounted onto the ink cartridge inserting unit 104 via a tube for supplying ink.

A sheet feeding unit to feed a non-porous substrate 142 loaded on a non-porous substrate loader (pressure plate) 141 of the sheet feeder tray 102 includes a half moon-like form roller (sheet feeding roller 143) to separate and feed the non-porous substrate 142 one by one from the non-porous substrate loader 141, and a separation pad 144 made of a material having a large friction index and arranged facing the sheet feeding roller 143 while this separation pad 144 is biased to the side of the sheet feeding roller 143.

A transfer unit to transfer the non-porous substrate 142 fed from the sheet feeding unit on the lower side of the recording head 134 includes a transfer belt 151 to electrostatically adsorb and transfer the non-porous substrate 142, a counter roller 152 to transfer the non-porous substrate 142 fed from the sheet feeding unit via a guide 145 while pinching the non-porous substrate 142 with the transfer belt 151, a transfer guide 153 to make the non-porous substrate 142 track on the transfer belt 151 by changing the transfer direction of the non-porous substrate 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 has an endless form, stretched between a transfer roller 157 and a tension roller 158 and rotatable in the belt transfer direction. This transfer belt 151 include, for example, a top layer serving as a non-porous substrate adsorption surface made of a resin material such as a copolymer (ETFE) of tetrafluoroethylene and ethylene with no resistance control treatment while having a thickness about 40 µm and a bottom layer (moderate resistance layer, earth layer) made of the same material as the top layer with resistance control treatment with carbon. On the rear side of the transfer belt 151, a guiding member 161 is arranged corresponding to the printing area by the recording head 134.

A discharging unit to discharge the non-porous substrate 142 on which images are recorded by the recording head 134 includes a separation claw 171 to separate the sheet 142 from the transfer belt 151, a discharging roller 172, and a discharging roller 173. The non-porous substrate 142 is dried by heat wind by a fun heater 174 and thereafter output to a discharging tray 103 arranged below the discharging roller 172.

A duplex printing sheet feeding unit 181 is detachably attached to the rear side of the inkjet recording device 101.

The duplex printing sheet feeding unit 181 takes in and reverses the non-porous substrate 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recording device of the present disclosure, the non-porous substrate 142 is separated and fed from the sheet feeding unit one by one substantially vertically upward, guided by the guide 145, and transferred while being pinched between the transfer belt 151 and the counter roller 152. Furthermore, the front end is guided by the transfer guide 153 and pressed against the transfer belt 151 by the front end pressure roller 155 to change the transfer direction substantially 90°.

Since the transfer belt 151 is charged by the charging roller 156 at this point in time, the non-porous substrate 142 is electrostatically adsorbed to the transfer belt 151 and transferred. By driving the recording head 134 according to the image signal while moving the carriage 133, the ink droplet is discharged to the non-porous substrate 142 not in motion to record an image in an amount of one line and thereafter the non-porous substrate 142 is transferred in a predetermined amount to be ready for the recording for the next line. On receiving a record completion signal or a signal indicating that the rear end of the non-porous substrate 142 has reached the image recording area, the recording operation stops and the non-porous substrate 142 is discharged to the discharging tray 103.

A serial type (shuttle type) in which the carriage scans is used in this description but this is true in a line-type inkjet recording device having a line type head.

The inkjet recording device of the present disclosure can be applied to recording systems employing inkjet recording system such as printers, facsimile machines, photocopiers, multi-functional machines (printer/facsimile/photocopier) for inkjet recording in particular.

Heating of Recording Medium

In the present disclosure, to improve drying property, gloss, and abrasion resistance, it is indispensable to print an image on a recording medium with the ink of the present disclosure followed by heating the printed recording medium. The heating temperature is preferably from 40° C. to 80° C. and more preferably from 50° C. to 80° C.

An inkjet recording device capable of outputting good images without heat deformation of the substrate therein can be obtained by setting a particular temperature.

Inkjet Printed Matter

The inkjet printed matter of the present disclosure is a recording medium on which information or an image is recorded by using the ink of the present disclosure.

There is no specific limit to the selection of the recording medium. For examples, plain paper, gloss paper, special paper, cloth, film, and transparent sheets can be used. The ink of the present disclosure has good drying property on a non-porous substrate and a high gloss at printed portions thereof and contributes to production of printed matters having excellent abrasion resistance.

There is no specific limit to the non-porous substrate. For example, as the non-porous substrate, a recording medium made of a hydrophilic resin such as vinyl chloride, polyethylene terephthalate (PET), polypropylene, polyethylene, and polycarbonate is suitable. Also, a recording medium such as coated paper for paper for printing is suitable which causes a problem such that the aqueous ink does not dry in the printing process of a typical inkjet printing in a normal temperature and normal humidity environment because the recording medium absorbs water to some degree but slow at absorption. Of these recording media, the ink of the present disclosure demonstrates excellent quick drying and high gloss in particular for the recording medium made of a hydrophilic resin which never little absorbs water.

These printed matter can be used alone or in combination. The inkjet printed matter obtained in the present disclosure has high gloss, excellent abrasion resistance, and can be suitably used for various purposes.

Recording Method

The inkjet recording method of the present disclosure has a printing process to print an image on a recording medium using an aqueous ink for inkjet recording and a heating process to heat the printed recording medium. The aqueous ink for inkjet recording contains water, a hydrosoluble organic solvent, resin particles, and a pigment.

The hydrosoluble organic solvent contains at least three kinds of diol compounds accounting for 45% by weight or more in the hydrosoluble organic solvent. In addition, three or more of the at least three kinds of diol compounds have boiling points 10° C. or greater apart from each other.

There is no specific limit to the heating device for use in the heating process. As described above, devices for forced-air heating, radiation heating, conduction heating, or microwave drying are used. These can be used alone or in combination.

The heating temperature of the heating device (heater) for a recording medium is preferably from 40° C. to 80° C. and more preferably from 50° C. to 80° C.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

After preliminarily mixing the following recipe, a liquid dispersion of pigment was obtained by conducting circulation dispersion for seven hours by a disk-type bead mill (KDL type, manufactured by (SHINMARU ENTERPRISES CORPORATION); Media: zirconia ball having a diameter of 0.3 mm).

Composition of Liquid Dispersion of Pigment

Carbon black pigment: 15 parts

Anionic surfactant (Pionine A-51-B, manufactured by TAKEMOTO OIL & FAT Co., Ltd.): 2 parts De ionized water: 83 parts Using the liquid dispersion of pigment, the following recipe was mixed and stirred and thereafter filtrated by a polypropylene filter of 0.2 μm to prepare ink.

Ink Composition

Liquid dispersion mentioned above: 20 parts

Liquid dispersion of aqueous polyurethane resin particle (HYDRAN HW-340, solid portion: 25%, solvent: water, average particle diameter: 35 nm, manufactured by DIC Corporation): 60 parts Surfactant: $CH_3(CH_2)_{12}O(CH_2CH_2O)_3CH_2COOH$: 2 parts 2,3-butane diol (bp: 183° C.): 10 parts 3-methyl-1,3-butane diol (bp: 203° C.): 8 parts 1,3-butane diol (bp: 214° C.): 10 parts Diethylene glycol n butyl ether (bp: 183° C.): 12 parts Preservatives and fungicides (PROXEL LV, manufactured by AVECIA GROUP): 0.1 parts The thus-manufactures manufactured ink was evaluated as follows. The evaluation results are shown in Table 7.

Evaluation on Drying Property

An inkjet printer (remodeled based on IPSiO GXe 5500, manufactured by RICOH Co., Ltd.) having a heater after printing was filled with the manufactured ink. A solid image was printed on a non-porous substrate (white vinyl chloride sheet IJ5334, manufactured by Sumitomo 3M Limited.) followed by drying at 70° C. by a heating fun to form an image. Thereafter, filter paper was pressed against the solid portion. The degree of transfer of the ink to the filter paper was evaluated according to the following criteria:

A: No transfer of ink to filter paper on drying condition of 25° C. for 15 minutes B: No transfer of ink to filter paper on drying condition of 25° C. for 30 minutes C: No transfer of ink to filter paper on drying condition of 25° C. for 60 minutes D: Transfer of ink to filter paper continuing after drying at 25° C. for 60 minutes Evaluation of Image Gloss An inkjet printer (remodeled based on IPSiO GXe 5500, manufactured by RICOH Co., Ltd.) having a heater used after printing operation was filled with the manufactured ink. A solid image was printed on a non-porous substrate (white vinyl chloride sheet IJ5334, manufactured by Sumitomo 3M Limited.) followed by drying at 70° C. by a heating fun to form an image. Thereafter, gloss at 60° degree of the solid image portion was measured by a gloss meter (4501, manufactured by BYK Gardener) and evaluated according to the following criteria.

A: Gloss at 60° greater than 100%

B: Gloss at 60° from 81% to 100%

C: Gloss at 60° from 60% to 80%

D: Gloss at 60° less than 60%

Evaluation on Abrasion Resistance

An inkjet printer (remodeled based on IPSiO GXe 5500, manufactured by RICOH Co., Ltd.) having a heater after printing was filled with the manufactured ink. A solid image was printed on a non-porous substrate (white vinyl chloride sheet IJ5331, manufactured by Sumitomo 3M Limited.) followed by drying at 70° C. by the heating fun to form an image. Thereafter, the solid portion was abraded by drying cotton (unbleached muslin No. 3) with a load of 400 g and evaluated about abrasion resistance according to the following criteria:

A: No change in image after abraded $50^+$ times

B: Slight scratch observed when abraded 50 times but causing no damage to image density with no practical problem C: Image density degraded when abraded 21 times to 50 time D: Image density degraded when abraded $20^-$ times

Example 2

The ink of Example 2 was manufactured in the same manner as in Example 1 except that the ink recipe was changed to the following: The manufactured ink was evaluated in the same manner as in Example 1.

Ink Composition

Liquid dispersion of pigment: 20 parts

Liquid dispersion of aqueous polyurethane resin particle (HYDRAN HW-340, solid portion: 25%, solvent: water, average particle diameter: 35 nm, manufactured by DIC Corporation): 60 parts Surfactant: $CH_3(CH_2)_{12}O(CH_2CH_2O)_3CH_2COOH$: 2 parts 2,3-butane diol (bp: 183° C.): 8 parts 3-methyl-1,3-butane diol (bp: 203° C.): 8 parts 1,3-butane diol (bp: 214° C.): 8 parts Diethylene glycol n butyl ether (bp: 183° C.): 16 parts Preservatives and fungicides (PROXEL LV, manufactured by AVECIA GROUP): 0.1 parts

Example 3

The ink of Example 3 was manufactured in the same manner as in Example 1 except that the ink recipe was changed to the following: The manufactured ink was evaluated in the same manner as in Example 1.

Ink Composition

Liquid dispersion of pigment: 20 parts

Liquid dispersion of aqueous polyurethane resin particle (HYDRAN HW-340, solid portion: 25% solvent: water, average particle diameter: 35 nm, manufactured by DIC Corporation): 60 parts Surfactant: $CH_3(CH_2)_{12}O(CH_2CH_2O)_3CH_2COOH$: 2 parts 2,3-butane diol (bp: 183° C.): 6 parts 3-methyl-1,3-butane diol (bp: 203° C.): 8 parts 1,3-butane diol (bp: 214° C.): 6 parts Diethylene glycol n butyl ether (bp: 230° C.): 20 parts Preservatives and fungicides (PROXEL LV, manufactured by AVECIA GROUP): 0.1 parts

Example 4

The ink of Example 4 was manufactured in the same manner as in Example 1 except that the ink recipe was changed to the following: The manufactured ink was evaluated in the same manner as in Example 1.

Ink Composition

Liquid dispersion of pigment: 20 parts

Liquid dispersion of aqueous polyurethane resin particle (HYDRAN HW-340, solid portion: 25%, solvent: water, average particle diameter: 35 am, manufactured by DIC Corporation): 60 parts Surfactant: $CH_3(CH_2)_{12}O(CH_2CH_2O)_3CH_2COOH$: 2 parts 2,3-butane diol (bp: 183° C.): 5 parts 2-methyl-2,4-pentane diol (bp: 198° C.): 5 parts 3-methyl-1,3-butane diol (bp: 203° C.): 5 parts 1,3-butane diol (bp: 214° C.): 5 parts Diethylene glycol n butyl ether (bp: 230° C.): 20 parts Preservatives and fungicides (PROXEL LV, manufactured by AVECIA GROUP): 0.1 parts

Example 5

The ink of Example 5 was manufactured in the same manner as in Example 1 except that the ink recipe was changed to the following: The manufactured ink was evaluated in the same manner as in Example 1.

Ink Composition

Liquid dispersion of pigment: 20 parts

Liquid dispersion of aqueous polyurethane resin particle (HYDRAN HW-340, solid portion: 25%, solvent: water, average particle diameter: 35 nm, manufactured by DIC Corporation): 60 parts 2,3-butane diol (bp: 183° C.): 4 parts 2-methyl-2,4-pentane diol (bp: 198° C.): 4 parts 1,3-butane diol (bp: 203° C.): 4 parts 3-methyl-1,3-butane diol (bp: 203° C.): 4 parts
1,3-butane diol (bp: 214° C.): 4 parts
Diethylene glycol n butyl ether (bp: 230° C.): 20 parts
Preservatives and fungicides (PROXEL LV, manufactured by AVECIA GROUP): 0.1 parts Example 6

The ink of Example 6 was manufactured in the same manner as in Example 1 except that the ink recipe was changed to the following: The manufactured ink was evaluated in the same manner as in Example 1.
Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 60 parts
Surfactant: $CH_3(CH_2)_{12}O(CH_2CH_2O)_3CH_2COOH$: 2 parts
1,2-butane diol (bp: 187° C.): 6 parts
1,3-butane diol (bp: 203° C.): 8 parts
1,3-propane diol (bp: 214° C.): 6 parts
Diethylene glycol n butyl ether (bp: 230° C.): 20 parts
Preservatives and fungicides (PROXEL LV, manufactured by AVECIA GROUP): 0.1 parts Example 7

The ink of Example 7 was manufactured in the same manner as in Example 1 except that the ink recipe was changed to the following: The manufactured ink was evaluated in the same manner as in Example 1.
Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 60 parts
Surfactant: $CH_3(CH_2)_{12}O(CH_2)_{12}O(CH_2O)_3CH_2COOH$: 2 parts
2,3-butane diol (bp: 183° C.): 6 parts
1,3-butane diol (bp: 203° C.): 8 parts
1,2-hexane diol (bp: 223° C.): 6 parts
Diethylene glycol n butyl ether (bp: 230° C.): 20 parts
Preservatives and fungicides (PROXEL LV, manufactured by AVECIA GROUP): 0.1 parts Example 8

The ink of Example 8 was manufactured in the same manner as in Example 1 except that the ink recipe was changed to the following: The manufactured ink was evaluated in the same manner as in Example 1,
Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 60 parts
Surfactant: $CH_3(CH_2)_{12}O(CH_2CH_2O)_3CH_2COOH$: 2 parts
1,2-butane diol (bp: 194° C.): 6 parts
1,3-propane diol (bp: 214° C.): 8 parts
1,4-butane diol (bp: 230° C.): 6 parts
Diethylene glycol n butyl ether (bp: 230° C.): 20 parts
Preservatives and fungicides (PROXEL LV, manufactured by AVECIA GROUP): 0.1 parts Example 9

The ink of Example 9 was manufactured in the same manner as in Example 1 except that the ink recipe was changed to the following: The manufactured ink was evaluated in the same manner as in Example 1.
Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 60 parts
Surfactant: $CH_3(CH_2)_{12}O(CH_2CH_2O)_3CH_2COOH$: 2 parts
2,3-butane diol (bp: 183° C.): 6 parts
1,3-propane diol (bp: 214° C.): 8 parts
Diethylene glycol (bp: 245° C.): 6 parts
Diethylene glycol n butyl ether (bp: 230° C.): 20 parts
Preservatives and fungicides (PROXEL LV, manufactured by AVECIA GROUP): 0.1 parts Example 10

The ink of Example 10 was manufactured in the same manner as in Example 1 except that the ink recipe was changed to the following: The manufactured ink was evaluated in the same manner as in Example 1.
Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 60 parts
Surfactant: $CH_3(CH_2)_{12}O(CH_2CH_2O)_3CH_2COOH$: 2 parts
2,3-butane diol (bp: 183° C.): 6 parts
1,3-butane diol (bp: 203° C.): 8 parts
1,3-propane diol (bp: 214° C.): 6 parts
Glycerin (bp: 290° C.): 2 parts
Diethylene glycol n butyl ether (bp: 230° C.): 18 parts
Preservatives and fungicides (PROXEL LV, manufactured by AVECIA GROUP): 0.1 parts Example 11

The ink of Example 11 was manufactured in the same manner as in Example 1 except that the ink recipe was changed to the following: The manufactured ink was evaluated in the same manner as in Example 1.
Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 8 parts
Surfactant: $CH_3(CH_2)_{12}O(CH_2CH_2O)_3CH_2COOH$: 2 parts
2,3-butane diol (bp: 183° C.): 6 parts
1,3-butane diol (bp: 203° C.): 8 parts
1,3-propane diol (bp: 214° C.): 6 parts
Diethylene glycol n butyl ether (bp: 230° C.): 18 parts
Preservatives and fungicides (PROXEL LV, manufactured by AVECIA GROUP): 0.1 parts
Water: 39 parts

Example 12

The ink of Example 12 was manufactured in the same manner as in Example 1 except that the ink recipe was changed to the following: The manufactured ink was evaluated in the same manner as in Example 1.

Ink Composition
Liquid dispersion of pigment: 20 parts
Liquid dispersion of aqueous polyurethane resin particle (HYDRAN HW-340, solid portion: 25%, solvent: water, average particle diameter: 60 nm, manufactured by DIC Corporation): 60 parts
Surfactant: $CH_3(CH_2)_{12}O(CH_2CH_2O)_3CH_2COOH$: 2 parts
1,3-butane diol (bp: 183° C.): 6 parts
1,3-butane diol (bp: 203° C.): 8 parts
1,3-propane diol (bp: 214° C.): 6 parts
Glycerin (bp: 290° C.): 2 parts
Diethylene glycol n butyl ether (bp: 230° C.): 18 parts
Preservatives and fungicides (PROXEL LV, manufactured by AVECIA GROUP): 0.1 parts

Example 13

An inkjet printer (remodeled based on IPSiO GXe 5500, manufactured by RICOH Co., Ltd.) having a heater used after printing operation was filled with the ink manufactured in the same manner as in Example 3. A solid image was printed on a non-porous substrate (white vinyl chloride sheet IJ5331, manufactured by Sumitomo 3M Limited.) followed by drying at 40° C. by the heating fun to form an image and evaluated in the same manner as in Example 3.

Example 14

Images were formed in the same manner as in Example 13 except that the drying temperature was changed to 40° C. to 50° C. and evaluated in the same manner as in Example 13.

Example 15

Images were formed in the same manner as in Example 13 except that the drying temperature was changed to 40° C. to 60° C. and evaluated in the same manner as in Example 13.

Example 16

Images were formed in the same manner as in Example 13 except that the drying temperature was changed to 40° C. to 80° C. and evaluated in the same manner as in Example 13.

Example 17

Images were formed in the same manner as in Example 13 except that the drying temperature was changed to 40° C. to 90° C. and evaluated in the same manner as in Example 13.

Comparative Example 1

The ink of Comparative Example 1 was manufactured in the same manner as in Example 1 except that the ink recipe was changed to the following: The manufactured ink was evaluated in the same manner as in Example 1.

Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 60 parts
Surfactant: $CH_3(CH_2)_{12}O(CH_2CH_2O)_3CH_2COOH$: 2 parts
2,3-butane diol (bp: 183° C.): 6 parts
1,2-propane diol (bp: 187° C.): 8 parts
1,3-propane diol (bp: 214° C.): 6 parts
Diethylene glycol n butyl ether (bp: 230° C.): 20 parts
Preservatives and fungicides (PROXEL LV, manufactured by AVECIA GROUP): 0.1 parts

Comparative Example 2

The ink of Comparative Example 2 was manufactured in the same manner as in Example 1 except that the ink recipe was changed to the following: The manufactured ink was evaluated in the same manner as in Example 1.

Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 60 parts
Surfactant: $CH_3(CH_2)_{12}O(CH_2CH_2O)_3CH_2COOH$: 2 parts
2,3-butane diol (bp: 183° C.): 6 parts
1,3-butane diol (bp: 203° C.): 4 parts
1,3-propane diol (bp: 214° C.): 6 parts
Diethylene glycol n butyl ether (bp: 230° C.): 24 parts
Preservatives and fungicides (PROXEL LV, manufactured by AVECIA GROUP): 0.1 parts

Comparative Example 3

The ink of Comparative Example 3 was manufactured in the same manner as in Example 1 except that the ink recipe was changed to the following: The manufactured ink was evaluated in the same manner as in Example 1.

Ink Composition
Liquid dispersion of pigment: 20 parts
Liquid dispersion of aqueous polyurethane resin particle (HYDRAN HW-340, solid portion: 25%, solvent: water, average particle diameter: 35 nm, manufactured by DIC Corporation): 60 parts
Surfactant: $CH_3(CH_2)_{12}O(CH_2CH_2O)_3CH_2COOH$: 2 parts
2,3-butane diol (bp: 183° C.): 10 parts
1,3-butane diol (bp: 214° C.): 10 parts
Diethylene glycol n butyl ether (bp: 230° C.): 20 parts
Preservatives and fungicides (PROXEL LV, manufactured by AVECIA GROUP): 0.1 parts

Comparative Example 4

The ink of Comparative Example 4 was manufactured in the same manner as in Example 1 except that the ink recipe was changed to the following: The manufactured ink was evaluated in the same manner as in Example 1.

Ink Composition
Liquid dispersion of pigment: 20 parts
Surfactant: $CH_3(CH_2)_{12}O(CH_2CH_2O)_3CH_2COOH$: 2 parts
1,3-butane diol (bp: 183° C.): 6 parts
1,3-butane diol (bp: 203° C.): 8 parts
1,3-propane diol (bp: 214° C.): 6 parts Diethylene glycol n butyl ether (bp: 230° C.): 20 parts
Preservatives and fungicides (PROXEL LV, manufactured by AVECIA GROUP): 0.1 parts
Water: 45 parts Comparative Example 5

An inkjet printer (remodeled based on IPSiO GXe 5500, manufactured by RICOH Co., Ltd.) having a heater used after printing operation was filled with the ink manufactured in the same manner as in Example 3. A solid image was printed on a non-porous substrate (white vinyl chloride sheet IJ5331, manufactured by Sumitomo 3M Limited.) to form an image without being dried by the heating fun and evaluated in the same manner as in Example 3.

The results of Examples 1 to 17 and Comparative Examples 1 to 5 are shown in Table 7.

TABLE 7

| | Drying property | Image gloss | Abrasion resistance |
|---|---|---|---|
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | A |
| Example 8 | B | A | B |
| Example 9 | B | A | A |
| Example 10 | B | A | B |
| Example 11 | A | B | B |
| Example 12 | B | B | B |
| Example 13 | A | B | A |
| Example 14 | A | A | A |
| Example 15 | A | A | A |
| Example 16 | A | A | A |
| Example 17 | A | B | A |
| Comparative Example 1 | A | D | A |
| Comparative Example 2 | C | D | C |
| Comparative Example 3 | A | D | A |
| Comparative Example 4 | A | D | D |
| Comparative Example 5 | D | C | D |

According to the present invention, an ink is provided which has good drying property, high gloss at printed portion, and excellent abrasion resistance.

Having now fully described embodiments of the present invention, it will be apparent to one of ordinary skill in the art that many changes and modifications can be made thereto without departing from the spirit and scope of embodiments of the invention as set forth herein.

What is claimed is:

1. An aqueous ink for inkjet recording comprising:
water;
a hydrosoluble organic solvent;
resin particles; and
a pigment,
wherein the hydrosoluble organic solvent comprises at least three kinds of diol compounds accounting for 45% by weight or more in the hydrosoluble organic solvent,
wherein three or more of the at least three kinds of diol compounds have boiling points 10° C. or greater apart from each other, and
wherein the hydrosoluble organic solvent further comprises a glycol ether in an amount greater than the amount of each of the at least three kinds of diol compounds.

2. The aqueous ink for inkjet recording according to claim 1, wherein a diol compound having the lowest boiling point of the at least three kinds of diol compounds is 2,3-butane diol or 1,2-propane diol.

3. The aqueous ink for inkjet recording according to claim 1, wherein a diol compound having the highest boiling point of the at least three kinds of diol compounds is 1,3-propane diol or 1,2-hexane diol.

4. The aqueous ink for inkjet recording according to claim 1, wherein the hydrosoluble organic solvent has a boiling point lower than 250° C.

5. The aqueous ink for inkjet recording according to claim 1, wherein a content of the resin particles is more than a content of the pigment.

6. The aqueous ink for inkjet recording according to claim 1, wherein the resin particles have a volume average particle diameter of from 10 nm to 50 nm.

7. An inkjet recording device comprising:
a printing device to print an image on a recording medium with the aqueous ink for inkjet recording of claim 1, and
a heating device to heat the recording medium from 40° C. to 80° C.

8. An inkjet printed matter comprising:
a recording medium; and
an image formed on the recording medium by using the aqueous ink for inkjet recording of claim 1.

9. An inkjet recording method comprising:
printing an image on a recording medium by using an aqueous ink for inkjet recording; and
heating the recording medium,
wherein the aqueous ink for inkjet recording comprises:
water, a hydrosoluble organic solvent, resin particles, and a pigment,
wherein the hydrosoluble organic solvent comprises at least three kinds of diol compounds accounting for 45% by weight or more in the hydrosoluble organic solvent,
wherein three or more of the at least three kinds of diol compounds have boiling points 10° C. or greater apart from each other, and
wherein the hydrosoluble organic solvent further comprises a glycol ether in an amount greater than the amount of each of the at least three kinds of diol compounds.

10. The aqueous ink for inkjet recording according to claim 1, wherein the hydrosoluble organic solvent further comprises at least one additional compound selected from the group consisting of a polyol alkyl ether, an ester, a nitrogen-containing heterocyclic compound, and an amide.

11. The inkjet recording method according to claim 9, wherein the hydrosoluble organic solvent further comprises at least one additional compound selected from the group consisting of a polyol alkyl ether, an ester, a nitrogen-containing heterocyclic compound, and an amide.

12. The aqueous ink for inkjet recording according to claim 1, wherein the glycol ether is diethylene glycol n butyl ether.

* * * * *